UNITED STATES PATENT OFFICE.

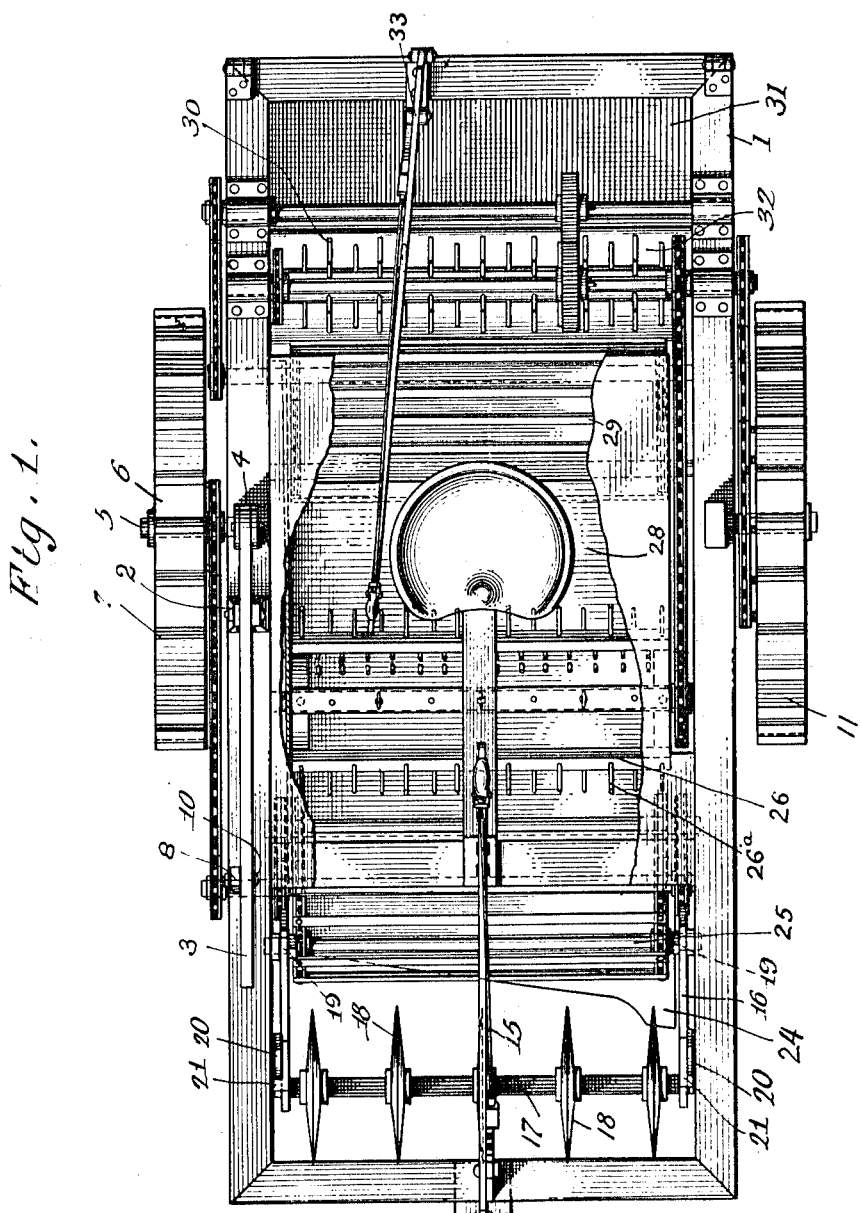

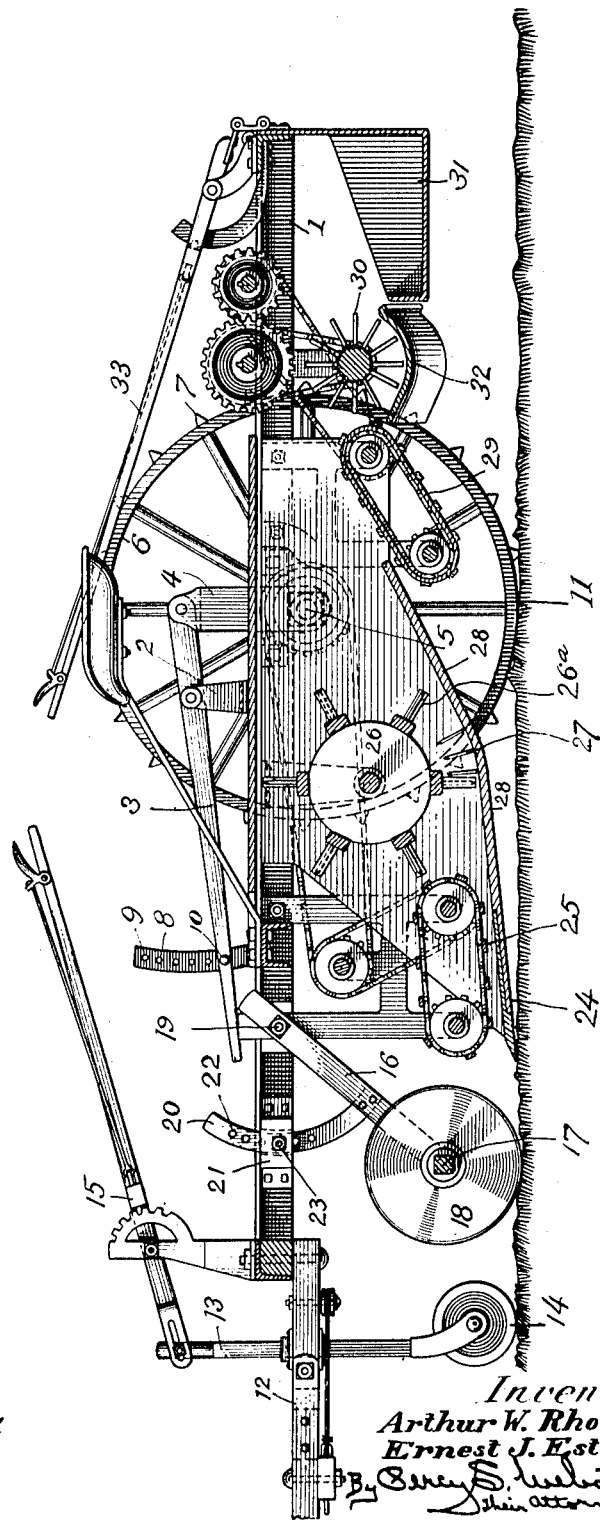

ERNEST JEROME ESTEY, OF KERMAN, AND ARTHUR WOOD RHODES, OF FRESNO, CALIFORNIA.

ROOT-SEPARATOR.

1,041,052.         Specification of Letters Patent.     Patented Oct. 15, 1912.

Application filed February 11, 1911. Serial No. 608,165.

*To all whom it may concern:*

Be it known that we, ERNEST JEROME ESTEY, a citizen of the United States, residing at Kerman, in the county of Fresno, State of California, and ARTHUR WOOD RHODES, a citizen of the United States, residing at Fresno, in the county of Fresno, State of California, have invented certain new and useful Improvements in Root-Separators; and we do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in farming implements of all kinds, and particularly to root separators, the object of the invention being to produce a machine which will plow up roots, separate the roots from the dirt and discharge the dirt independently of said roots and dump said roots in piles behind the machine on the plowed ground.

The machine is especially adapted for Johnson, Bermuda and salt grass roots.

A further object of the invention is to produce a simple and inexpensive device and yet one which will be exceedingly effective for the purposes for which it is designed.

These objects we accomplish by means of such structure and relative arrangement of parts as will fully appear by a perusal of the following specification and claim.

In the drawings similar characters of reference indicate corresponding parts in the several views.

Figure 1 is a top plan view partly broken out showing the complete machine. Fig. 2 is a longitudinal sectional view of the machine.

Referring now more particularly to the characters of reference on the drawings, we first provide a main frame 1. Mounted on this frame 1 is a supporting member 2 in which is fulcrumed a lever 3 carrying a block 4 in which is journaled a shaft 5 carrying a drive wheel 6. This drive wheel 6 is adapted to move in the furrow of the plowed ground and is provided with spikes or toes 7 to keep it from slipping. By means of the lever 3 the block 4 may be raised or lowered to raise or lower the wheel 6 in order to maintain the frame 1 in its level position at all times, and this lever 3 may be fixed in any desired position by fastening it to a bar 8 provided with holes 9 through which can be inserted bolts 10 to fasten said lever 3 in position on said bar 8.

On the other side of the frame 1 is fixed another supporting wheel 11. On the forward end of the frame 1 is a projecting tongue 12 through which is inserted a rod 13 carrying a forward supporting wheel 14, such member 13 being provided with a lever 15 adapted to raise and lower the rod 13 and wheel 14 as may be desired.

Just to the rear of the wheel 14 and mounted on the frame 1 are supporting bars 16 carrying a shaft 17 on which are mounted a plurality of cutters or disks 18 adapted to cut and loosen the grass and roots prior to the same being taken up by the plow and scraper hereinafter described. The members 16 are hinged to the member 1 as at 19, and are provided with curved bars 20 projecting through slotted guides 21 and having a plurality of holes 22 adapted to receive bolts 23 for the purpose of adjusting the cutters 18 at any height desired, as will appear.

To the rear of the cutters 18 is a scraper plow 24 adapted to cut the roots loose from the ground at the bottom and let the sod slide up on said scraper where it is carried by a conveyer 25 to the supporting cylinder hereinafter described. This conveyer 25 is operated by gears and chains driven from the wheel 6, as shown in Fig. 2. To the rear of said conveyer 25 is a supporting cylinder 26 having projecting teeth 26ᵃ, every other tooth being shaped like a knife blade and all the others being pointed. These teeth 26ᵃ work between teeth 27 projecting upwardly from a platform 28 leading from the scraper 24 and the operation of the teeth 26ᵃ through the teeth 27 tears the sod to pieces and throws it back upon the draper 29 where it is carried and deposited upon a rapidly revolving picker 30 which separates the roots from the dirt and throws the roots into the dump box 31, while the dirt is deposited into an inclined trough 32 where it discharges to the side of the machine. This last described mechanism is operated by suitable chains and gearing from the wheel 11.

The dump box 31 has an operating lever 33 for the purpose of dumping it when it is full.

From the foregoing description it will readily appear that we have produced such a device as substantially fulfils the objects of the invention as set forth herein.

While this specification sets forth in detail the present and preferred construction of the device, still in practice such deviations from such detail may be resorted to as do not form a departure from the spirit of the invention.

Having thus described our invention what we claim as new and useful and desire to secure by Letters Patent is:—

A device of the character described comprising a wheel mounted frame, a plurality of cutting disks disposed in the forward end of said frame, a scraper plow disposed at the rear of said disks, a conveyer operating over said scraper plow, a separating cylinder disposed to the rear of said scraper plow, a draper disposed to the rear of said separating cylinder, a picker upon which said last named draper discharges, an inclined trough beneath said picker, a dump box disposed at the rear of said picker and means for driving said drapers and said cylinders, as described.

Fresno Co. Cal. 12-8-10.

ERNEST JEROME ESTEY.
ARTHUR WOOD RHODES.

Witnesses:
EDWIN HERBERT SMITH,
HOMER CONDON.